(12) United States Patent
Ochi et al.

(10) Patent No.: US 9,007,510 B2
(45) Date of Patent: Apr. 14, 2015

(54) OPTICAL APPARATUS

(75) Inventors: Daisuke Ochi, Utsunomiya (JP); Yuki Nagao, Utsunomiya (JP); Atsushi Koyama, Utsunomiya (JP); Masayasu Mizushima, Utsunomiya (JP); Shigehiro Torii, Utsunomiya (JP); Kunihiko Sasaki, Utsunomiya (JP); Shota Shimada, Tokyo (JP); Hirokazu Shukuin, Shioya-gun (JP)

(73) Assignee: Canon Kabushiki Kaisha (JP)

( * ) Notice: Subject to any disclaimer, the term of this patent is extended or adjusted under 35 U.S.C. 154(b) by 184 days.

(21) Appl. No.: 13/613,009

(22) Filed: Sep. 13, 2012

(65) Prior Publication Data
US 2013/0070144 A1 Mar. 21, 2013

(30) Foreign Application Priority Data

Sep. 15, 2011 (JP) .................. 2011-201293

(51) Int. Cl.
*H04N 5/232* (2006.01)
*G02B 7/10* (2006.01)

(52) U.S. Cl.
CPC .......................... *G02B 7/10* (2013.01)

(58) Field of Classification Search
USPC ........................................................ 348/345
See application file for complete search history.

(56) References Cited

U.S. PATENT DOCUMENTS

| 5,038,164 | A | * | 8/1991 | Harada | 396/121 |
| 5,402,175 | A | | 3/1995 | Tanaka | |
| 5,815,745 | A | * | 9/1998 | Ohsawa | 396/76 |
| 5,877,811 | A | * | 3/1999 | Iijima et al. | 348/375 |
| 2004/0184795 | A1 | * | 9/2004 | Okawara | 396/1 |
| 2005/0001924 | A1 | * | 1/2005 | Honda | 348/348 |
| 2009/0273702 | A1 | * | 11/2009 | Okawara | 348/345 |
| 2013/0148001 | A1 | | 6/2013 | Nakano | |

FOREIGN PATENT DOCUMENTS

| CN | 1536384 A | 10/2004 |
| CN | 1637456 A | 7/2005 |

(Continued)

OTHER PUBLICATIONS

European Search Report issued in European counterpart application No. EP12183874.2, dated Jul. 4, 2013.

(Continued)

*Primary Examiner* — James Hannett
(74) *Attorney, Agent, or Firm* — Rossi, Kimms & McDowell LLP (57) ABSTRACT

An optical apparatus is configured to execute a manual focus mode in which focusing is performed by an operation of a manual operating unit by moving an image pickup optical system configured to form an optical image of an object. The optical apparatus includes a diaphragm configured to adjust a light quantity, and a controller configured to control a movement of the image pickup optical system in accordance with an operating amount of the manual operating unit so that a unit moving amount that is a moving amount of an in-focus position of the image pickup optical system per unit operation of the manual operating unit corresponds to a product between a diameter of a minimum confusion circle of the image pickup optical system, a diaphragm value of the diaphragm in the manual focus mode, and a coefficient that is a natural number or a reciprocal of the natural number.

8 Claims, 7 Drawing Sheets

(56) References Cited

FOREIGN PATENT DOCUMENTS

| | | |
|---|---|---|
| JP | 2005142660 A | 6/2005 |
| JP | 2011049661 A | 3/2011 |

OTHER PUBLICATIONS

Notification of the First Office Action for corresponding CN201210334129.7, mail date Jun. 5, 2014. English translation provided.

\* cited by examiner

OPTICAL APPARATUS

BACKGROUND OF THE INVENTION

1. Field of the Invention

The present invention relates to an optical apparatus that can execute a manual focus mode that enables a focus lens to move in an optical axis direction so as to provide focusing through manual operating.

2. Description of the Related Art

In a manual focus (which may be referred to as "MF" hereinafter), a focus lens is moved beyond a position to be focused and this position is set to an in-focus position. Since the manual focus is demanded to quickly obtain the in-focus position with a small amount of manual operations, it is important to set a unit moving amount that is a moving amount of the in-focus position per unit operation of the manual operating unit. An excessively small unit moving amount will improve the in-focus accuracy but require a large amount of manual operations and lowers the operability. An excessively large unit moving amount will reduce an amount of manual operation but lower the focusing accuracy because the focus lens cannot be positioned at a desired position.

Conventionally, Japanese Patent Laid-Open No. ("JP") 2005-142660 discloses a method for setting this unit moving amount (or corresponding driving amount of the focus lens) in accordance with the object distance, and JP 2011-49661 discloses two types of unit moving amounts, such as a micro driving amount and a rough driving amount. However, JP 2011-49661 does not disclose a concrete driving amount.

JPs 2005-142660 and 2011-49661 do not thoroughly examine a unit moving amount (or corresponding driving amount of the focus lens) of the in-focus position in the manual focus, and it is difficult to handle both the operability and the focusing accuracy.

SUMMARY OF THE INVENTION

The present invention provides an optical apparatus configured to provide manual focusing having good operability and focusing accuracy.

An optical apparatus according to the present invention is configured to execute a manual focus mode in which focusing is performed by an operation of a manual operating unit by moving an image pickup optical system configured to form an optical image of an object. The optical apparatus includes a diaphragm configured to adjust a light quantity, and a controller configured to control a movement of the image pickup optical system in accordance with an operating amount of the manual operating unit so that a unit moving amount that is a moving amount of an in-focus position of the image pickup optical system per unit operation of the manual operating unit corresponds to a product between a diameter of a minimum confusion circle of the image pickup optical system, a diaphragm value of the diaphragm in the manual focus mode, and a coefficient that is a natural number or a reciprocal of the natural number.

Further features of the present invention will become apparent from the following description of exemplary embodiments with reference to the attached drawings.

DESCRIPTION OF THE EMBODIMENTS

A description will now be given of the embodiments of the present invention with reference to the accompanying drawings.

First Embodiment

Figure 1:
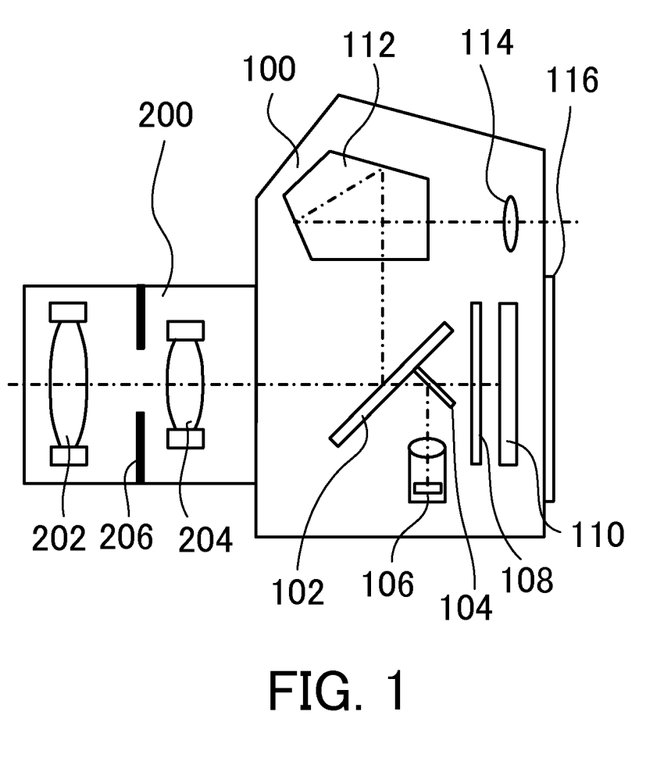
FIG. 1 is a schematic sectional view of a digital camera according to a first embodiment of the present invention.

FIG. 1 is a sectional view of a digital camera (optical apparatus, image pickup apparatus) that is configured as a lens-exchangeable digital single-lens reflex camera. Reference numeral 100 denotes a camera body, and reference numeral 200 denotes a lens barrel (exchange lens) attachable to the camera body 100. A type of the optical apparatus of this embodiment is not limited, and for example, a lens integrated camera and a film-based camera are applicable. The optical apparatus may be a lens exchangeable camera body, a camera system that includes a lens exchangeable camera body and an exchangeable lens, or a lens integrated camera.

The camera body 100 includes, as illustrated in FIG. 1, a main mirror 102, a sub-mirror 104, a focus detector 106, a shutter 108, an image pickup element 110, a penta-prism 112, a viewfinder optical system 114, and a monitor (display unit) 116, and can execute an MF mode.

The main mirror 102 reflects part of the light flux that has passed lens barrel 200, towards the viewfinder optical system 114, and transmits part of the light flux. The sub-mirror 104 reflects the light flux that has transmitted the main mirror 102 towards the focus detector 106. The main mirror 102 and the sub-mirror 104 are movable between a mirror-down state illustrated in FIG. 1 for non-image pickup in which these mirrors are located on the optical axis, and a mirror-up state (not illustrated) used to capture still and motion images in which these mirrors retreat from the optical axis. This embodiment is applicable to a so-called mirror-less camera.

The focus detector 106 is an AF sensor configured to detect a focus state utilizing a phase difference method, and includes a condenser lens (not illustrated) configured to split incident light into two light fluxes, two separator lenses configured to re-image the light flux, and a line sensor, such as a CCD, configured to provide a photoelectric conversion to an formed object image.

The shutter 108 is an exposure unit that opens during an exposure time period at image pickup time, and shields the light otherwise. The shutter 108 is released so as to start the exposure after a photometric end signal is issued. The image pickup element 110 is a CMOS, a CCD, or the like configured to photoelectrically convert an optical image of an object. The penta-prism 112 and the viewfinder optical system 114 enable a user to visually confirm an object image through a viewfinder (not illustrated).

The monitor 116 is a display unit located on the back surface of the camera body 100, and configured to display an image based on a signal output from the image pickup element 110, and a stored image. The monitor 116 can sequentially display (live-view) images based upon the signal output from the image pickup element. The camera of this embodiment possesses a live-view image pickup mode in which an image formed by the image pickup element 110 is displayed on the monitor 116, allowing the user to confirm the image and to perform focusing through the manual operation. In the live-view image pickup mode, precise and quick focusing upon the object is particularly demanded.

The lens barrel (exchange lens) 200 includes, as illustrated in FIG. 1, a first lens unit 202, a second lens unit 204 as a focusing optical system (focus lens), and a diaphragm unit 206. The first lens unit 202 and the second lens unit 204 constitute an image pickup optical system (image pickup lens) configured to form an optical image of an object. The image pickup lens may include more lens units, and contain a lens unit and driving unit for a zoom optical system.

In focusing, the second lens unit 204 is moved in the optical axis direction. A light quantity of the light flux (image pickup light) that passes the first lens unit 202 is restricted by the diaphragm unit 206.

The diaphragm unit 206 adjusts the light quantity, and includes a diaphragm driver controlled by the lens CPU 208 in accordance with a diaphragm operating command sent from the camera CPU 118, and a diaphragm driven by the diaphragm driver and configured to determine an opening area. A diaphragm value (F-value) of the diaphragm unit 206 is adjustable. The diaphragm may be provided to the camera body 100 or both the camera body 100 and the lens barrel 200.

Figure 2:
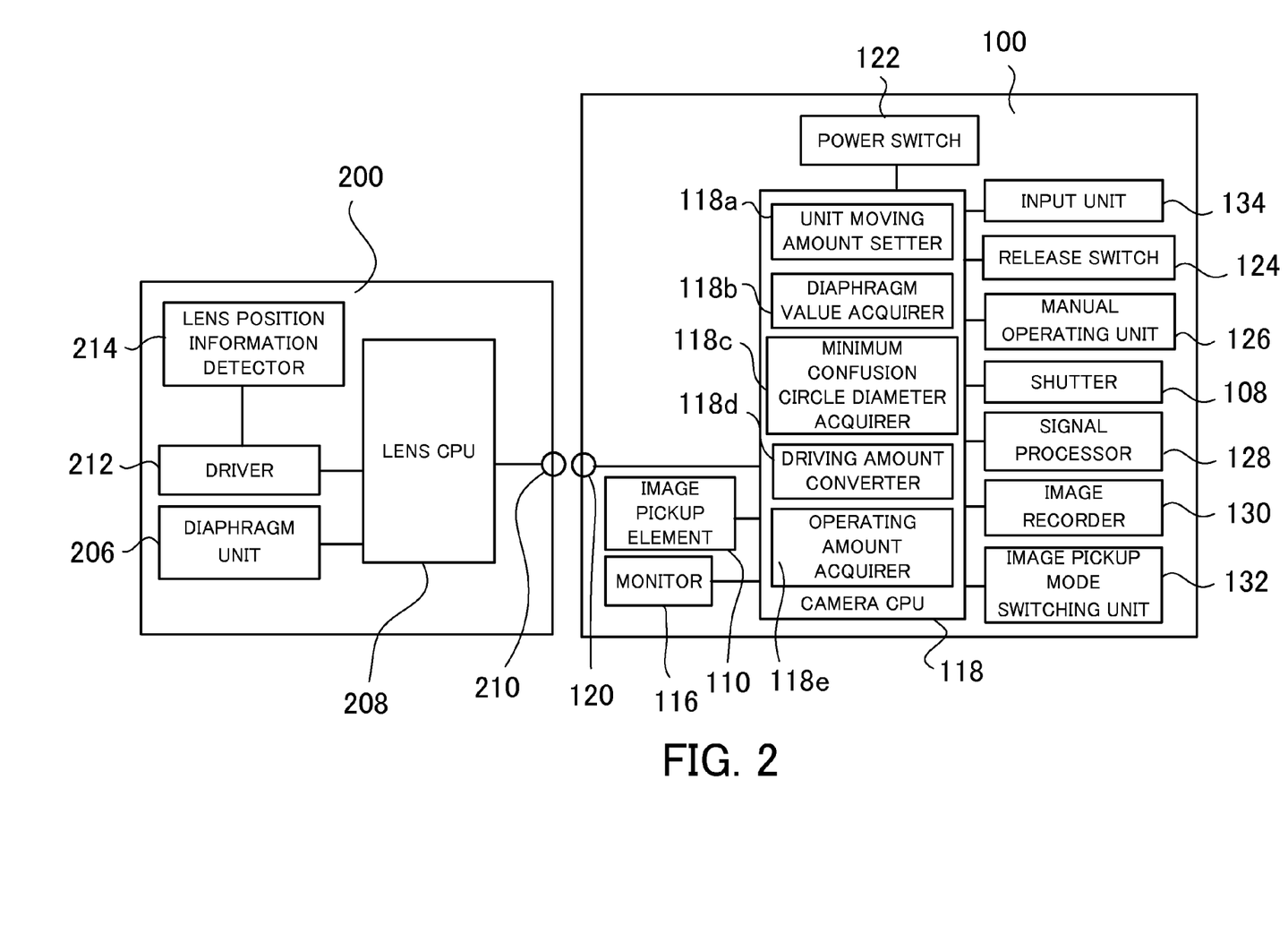
FIG. 2 is a system block diagram of the digital camera illustrated in FIG. 1 according to the first embodiment.

FIG. 2 is a system block diagram of the digital camera illustrated in FIG. 1.

The camera body 100 includes, as illustrated in FIG. 2, a camera CPU (controller) 118, a camera contact 120, a power switch 122, a release switch 124, a manual operating unit 126, a signal processor 128, an image recorder 130, an image pickup mode switching unit 132, and an input unit 134.

The camera CPU 118 includes a microcomputer, and controls each component in the camera body 100. The camera CPU 118 communicates with a lens CPU 208, which will be described later, and obtains a variety of information.

The camera CPU 118 includes a unit moving amount setter 118a, a diaphragm value acquirer 118b, a minimum confusion circle diameter acquirer 118c, a driving amount converter 118d, and an operating amount acquirer 118e.

The unit moving amount setter 118a sets a unit moving amount that is a moving amount of an in-focus position (focal plane) of the image pickup optical system per unit operation of the manual operating unit 126 in the manual focus mode (when the manual focus mode is set). In this embodiment, the unit moving amount setter 118a sets a product Fδ utilizing a diaphragm value F acquired by the diaphragm value acquirer 118b and a diameter δ of the minimum confusion circle acquired by the minimum confusion circle diameter acquirer 118c, to the unit moving amount of the in-focus position.

In general, Fδ may be further multiplied by a coefficient that is a natural number or a reciprocal of the natural number, and the result may be set as the unit moving amount. The coefficient may be variable in the manual focus mode.

Fδ is a depth of focus, and represents an in-focus range recognized by a user. Utilizing Fδ, the user can easily recognize a return amount when the focus lens passes the focus position (for example, when the coefficient is set to 1 as in this embodiment, the focus lens may be returned by one step). Thereby, this embodiment can maintain both the operability and the focusing precision.

The diaphragm value acquirer 118b acquires a (current) diaphragm value F of the diaphragm used to adjust the light quantity, in the MF from the lens CPU 208 that communicates with the diaphragm unit 206.

The minimum confusion circle diameter acquirer 118c acquires a diameter of the minimum confusion circle of the image pickup optical system from the lens CPU 208. Since the diameter δ of the minimum confusion circle is a fixed value, it may not be acquired in the MF mode and may be acquired in the initial communication with the lens CPU 208.

The driving amount converter 118d converts a unit moving amount set by the unit moving amount setter 118a into a driving amount for the second lens unit 204 based upon information acquired from the lens CPU 208. The information acquired from the lens CPU 208 contains position information of the second lens unit 204 and zoom position information detected by the lens position information detector 214, which will be described later, and a detailed description thereof will be omitted since the conventional method utilizes this conversion processing.

The operating amount acquirer 118e acquires a manual operating amount of the manual operating unit 126. The operating amount may be an operating amount in the MF and an operating amount used to set an area to be focused.

In this embodiment, the unit moving amount setter 118a sets the unit moving amount of the focus plane per unit operation of the manual operating unit 126 so that it can be proportional to the depth of focus, and the driving amount converter 118d converts it into an actual driving amount of the second lens unit 204. However, when the relationship between the moving amount of the in-focus position and the driving amount of the second lens unit 204 is previously known, the driving amount of the second lens unit 204 may be calculated without calculating the unit moving amount.

The camera contact 120 includes a signal transmitting contact used to transmit a signal to the lens barrel, and a power supplying contact used to supply the power to the lens.

The power switch 122 is operable from the outside by the user, and turns on the camera CPU 118 so as to supply power to each actuator and sensor in the system for the system operations.

The release switch 124 is a two-stage stroke type release switch that is operable from the outside. Its signal is input to the camera CPU 118, and enables to provide different controls according to the image pickup modes. For example, when the release switch 124 detects turning on of the first stroke switch, image pickup preparations such as the autofocus ("AF") and the auto-exposure ("AE") are performed. When it detects turning on of the second stroke switch, the release switch 124 performs an image pickup action, a production and recording of a digital image signal.

The manual operating unit 126 is used for the manual focus used to step the second lens unit 204 in the optical axis direction for each unit operation.

The signal processor 128 performs a variety of types of processing for digitally converted outputs from the image pickup element 110. The image recorder 130 records and saves image data output from the signal processor 128 in a recording medium (not illustrated).

The image pickup mode switching unit 132 sets the live-view image pickup mode when the live-view image pickup mode is selected.

The input unit 134 includes a dial, a button, a screen, or a lever used by a user to input or set a variety of information. For example, the user can set a manual focus mode (MF mode) with which he moves the second lens unit 204 for focusing through the manual operating unit 126. In addition, the user may input a coefficient by which the depth of focus Fδ is multiplied via the input unit 134.

The lens barrel 200 includes, as illustrated in FIG. 2, a lens CPU 208, a lens contact 210, a driver 212, and a lens position information detector 214.

The lens CPU 208 communicates with the camera CPU 118, and controls each component in the lens barrel 200. The lens contact 210 includes a signal transmitting contact used to receive a signal from the camera body 100, and a power supplying contact through which the power is supplied from the camera body 100.

The driver 212 drives the second lens unit 204 in the optical axis direction. The lens position information detector 214 detects a moving amount of the second lens unit 204, and includes an encoder.

Figure 3:
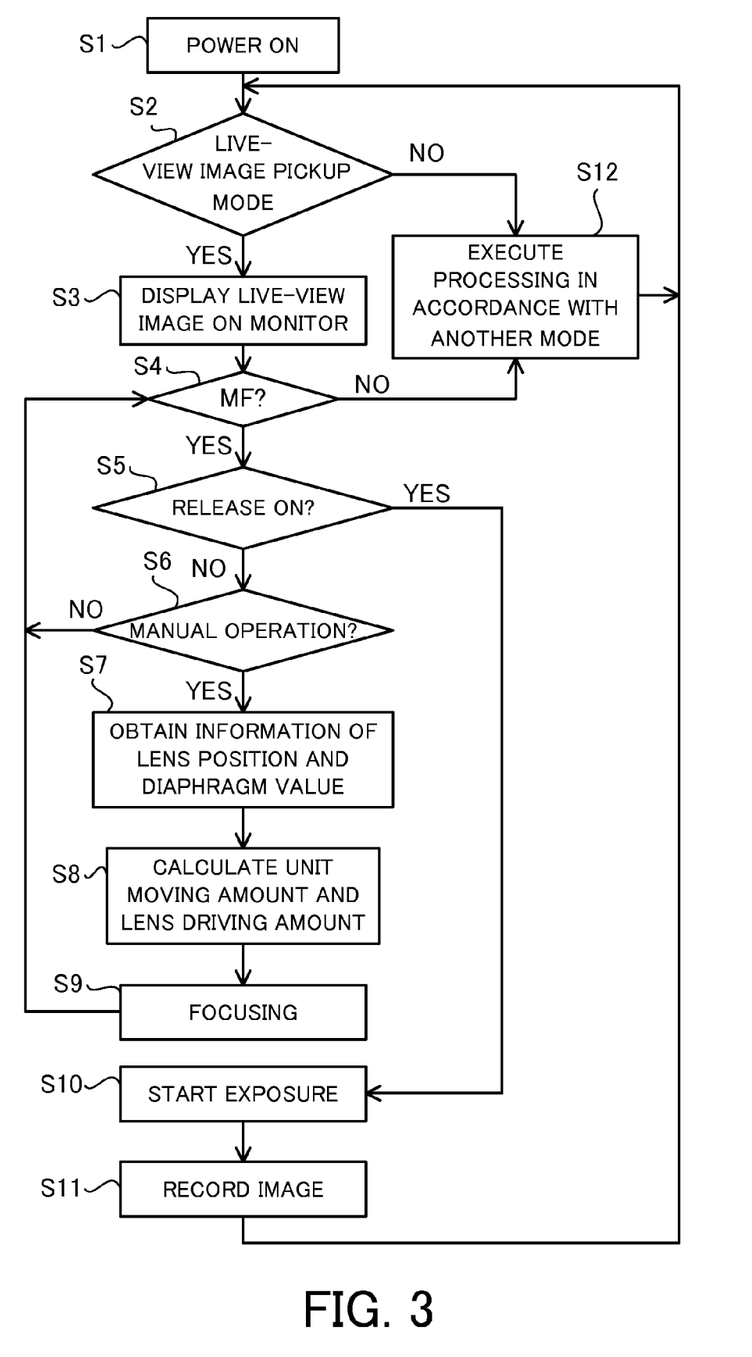
FIG. 3 is a flowchart illustrating an image pickup operation of the digital camera illustrated in FIG. 1 according to the first embodiment.

FIG. 3 is a flowchart for explaining an operation of the camera in the manual focus executed by the camera CPU 118, and "S" stands for the step. The flowchart illustrated in FIG. 3 can be implemented as a program that enables the computer to execute each step, and is stored as software in the memory (not illustrated) of the camera CPU 118 in this embodiment.

When the power switch 122 of the camera body 100 is turned on (S1), the camera CPU 118 determines whether the live-view image pickup mode is set to the image pickup mode by the image pickup mode switching unit 132 (S2). This embodiment provides S2 because it is effective that the unit moving amount of the second lens unit is set in the live-view image pickup mode. However, S2 is optional because a similar effect can be obtained by the observation of the object through the viewfinder.

When the live-view image pickup mode is not set (NO of S2), the camera CPU 118 executes processing in accordance with another mode (S12) and the flow returns to S2. When the live-view image pickup mode is set (YES of S2), the live-view image is displayed on the monitor 116 (S3).

Next, the camera CPU 118 determines whether the MF mode is set (S4). When the MF mode is not set (NO of S4), the camera CPU 118 moves to S12, and when the MF mode is set (YES of S4), it determines whether the second stroke switch of the release switch 124 turns on (S5).

When the second stroke switch of the release switch 124 turns on (YES of S5), the camera CPU 118 releases the shutter 108 for exposure (S10) and records the image captured by the image pickup element 110 through exposure in the image recorder 130 (S11). Then, the flow returns to S2.

On the other hand, when the release switch 124 turns off (NO of S5), the camera CPU 118 determines whether the manual operating unit 126 selects a focus area (S6), and if not (NO of S6), the flow returns to S4.

Figure 4A:
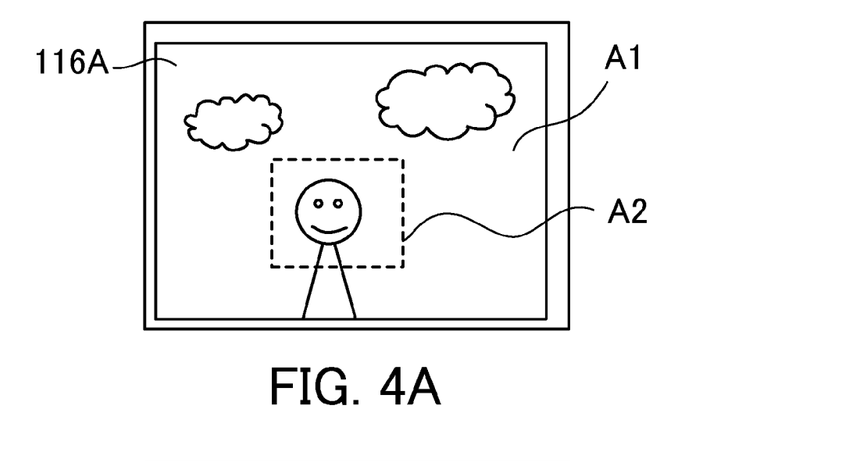
FIGS. 4A and 4B are plane views for explaining one example of S3 and S6 illustrated in FIG. 3 according to the first embodiment.
Figure 4B:
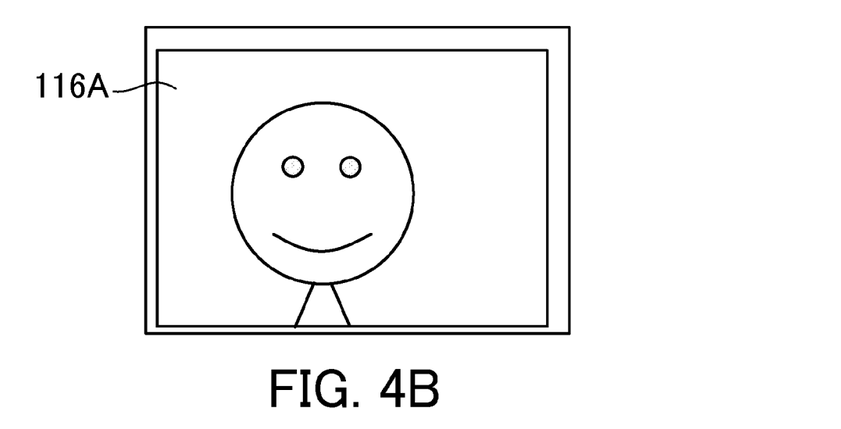

FIG. 4A is a plane view for explaining S6. Reference numeral 116A denotes a touch-screen monitor that has a display function as the monitor 116 and a touch-screen function as the manual operating unit 126. In FIG. 4A, an area A2 to be focused is set by the touch-screen operation in the live-view image A1 that is displayed with a single magnification in S3. When the area A2 is set, the contour is presented to the user by the dotted line, and then magnified as illustrated in FIG. 4B. Thereby, the focusing becomes easier.

When the focus area is selected by the manual operating unit 126 (YES of S6), the camera CPU 118 obtains information of the position of the second lens unit 204 and the diaphragm value from the lens CPU 208 (S7).

Next, the camera PCU 118 calculates the unit moving amount per unit operation, of the second lens unit 204 based upon the obtained information (S8). Now assume that no coefficient is input by the input unit 134 (or the coefficient of 1 is input), and the camera CPU 118 sets the depth of focus Fδ calculated from the diaphragm value F and the diameter δ of the minimum confusion circle, to the unit moving amount of the focus plane.

Figure 5:
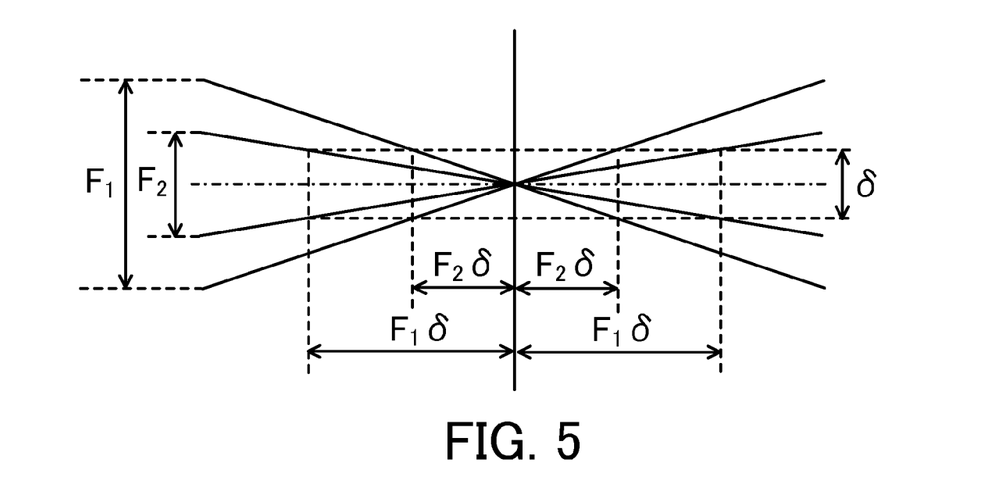
FIG. 5 is a view for explaining S8 of FIG. 3 according to the first embodiment.

FIG. 5 is a view for explaining S8. The diaphragm value F is a value made by dividing the focal length by the effective aperture of the image pickup lens, and it represents the brightness of the image pickup lens. This brightness is inversely proportional to the square of the diaphragm value F, and it becomes darker as the numerical value becomes higher. The minimum confusion circle diameter δ is a diameter of blurs which can be determined as point images in the digital camera. The depth of focus Fδ is a range in which an image can be clearly captured. In other words, only after the focal plane is moved by Fδ, the defocus of the captured image can be recognized.

As illustrated in FIG. 5, when the diaphragm value is $F_1 > F_2$, the relationship of the depth of focus becomes $F_1\delta > F_2\delta$. When the diaphragm value is $F_1$, the focal plane is moved by $F_1\delta$ so that the shift of the focal plane can be recognized. When the value is $F_2$, the focal plane is moved by $F_2\delta$ smaller than $F_1\delta$ so that the shift of the focal plane can be recognized.

Hence, when the diaphragm value F is large or when the depth of focus Fδ is large, focusing becomes easier as a moving amount of the focal plane is larger. When the diaphragm value F is small or when the depth of focus Fδ is small, focusing becomes easier as a moving amount of the focal plane is small.

The driving amount converter 118d in the camera CPU 118 converts the unit moving amount into the driving amount (moving amount) for the second lens unit 204 based upon the detection result of the lens position information detector 214 (S8).

Next, the operating amount acquirer 118e of the camera CPU 118 acquires the operating amount of the manual operating unit 126 by the user, and calculates the driving amount for the second lens unit 204 by multiplying the operating amount by the driving amount acquired in S8. The camera CPU 118 moves the focal plane by the predetermined amount Fδ for each unit operation of the manual operating unit 126 for the MF (S9), and the flow returns to S4.

Figure 6:
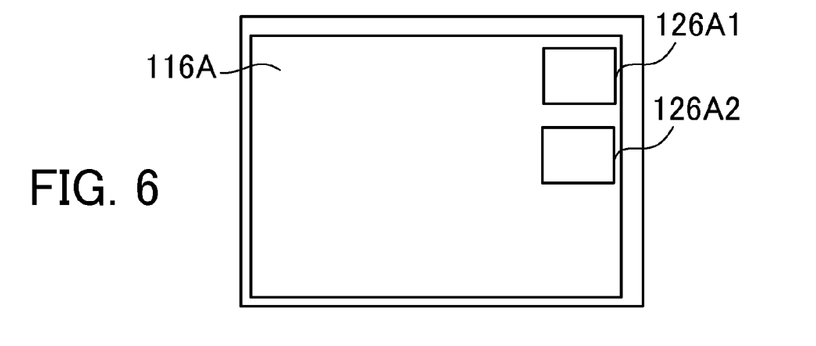
FIG. 6 is a plane view for explaining one example of S9 of FIG. 3 according to the first embodiment.

FIG. 6 is a plane view for explaining one example of S9. Reference numerals 126A1 and 126A2 denote touch-screen areas on the touch-screen monitor 116A that serve as the manual operating unit 126. When the user presses the touch-screen area 126A1 once, the focal plane is moved to the infinity side by the unit moving amount. When the user presses the touch-screen area 126A2 once, the focal plane is moved to the closest side by the unit moving amount.

The digital camera of this embodiment repeats the above operations until the power switch 122 is turned off. When it is turned off, the camera CPU 118 finishes the communications with the lens CPU 208, and the power supply to the camera body 100 and the lens barrel 200 are completed.

According to this embodiment, one manual operation moves the focal plane by the depth of focus Fδ and thus improves the operability, because the MF is performed for each minimum unit by which moving of the focal plane can be recognized.

As described above, the unit moving amount can be set to natural-number-fold as large as Fδ via the input unit 134. Thereby, a desired in-focus position can be quickly obtained by a small amount of manual operations and the operability can be improved. In addition, the unit moving amount can be a reciprocal of the natural number of Fδ, and thus the in-focus accuracy can be improved. For example, when the user sets the coefficient to ½ via the input unit 134, the user recognizes that the focal plane moves by Fδ through two steps and thus the operability improves because the shift of the focal plane cannot be recognized in prior art.

Moreover, the unit moving amount can be varied in the middle of processing by operating the input unit 134. As the current position is distant from the desired focus position, the unit moving amount may be set larger. As the current position close to the focus position, the unit moving amount may be set smaller. Thereby, this embodiment can handle both the operability and the in-focus accuracy.

According to this embodiment, focusing for each predetermined amount can be realized with a unit of the depth of focus per unit touch-screen operation, and thus the focusing upon the desired focal plane can be provided with good operability.

Second Embodiment

A digital camera according to a second embodiment is structurally similar to that illustrated in FIGS. 1 to 3, but this embodiment is different from the first embodiment in that the manual operating unit 126 utilizes a click type dial instead of the touch screen. The click type dial is configured to provide a click sense to a user for each unit rotation. In addition, the click type dial is configured to maintain the unit rotating angle.

Figure 7:
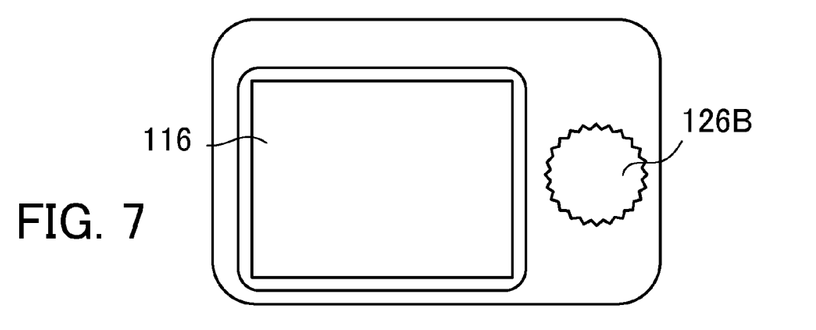
FIG. 7 is a rear view of a digital camera according to a second embodiment of the present invention.

FIG. 7 is a rear view of a digital camera according to a second embodiment. The click type dial 126B is located beside the display unit 116. In the MF operation, the depth of focus Fδ calculated in S7 in FIG. 3 is set to the unit moving amount of the focal plane, which corresponds to a one-click rotating angle of the click type dial 126B. In addition, the counterclockwise rotation of the click type dial 126B is set to the infinity side, and the clockwise rotation of the click type dial 126B is set to the closest side. The position of the click type dial 126B is not limited to the rear surface of the camera, and may be provided anywhere including the side surface.

This embodiment can provide focusing by the unit moving amount with a unit of the depth of focus per unit operation of the click type dial 126B, and improves the operability.

Third Embodiment

Figure 8:
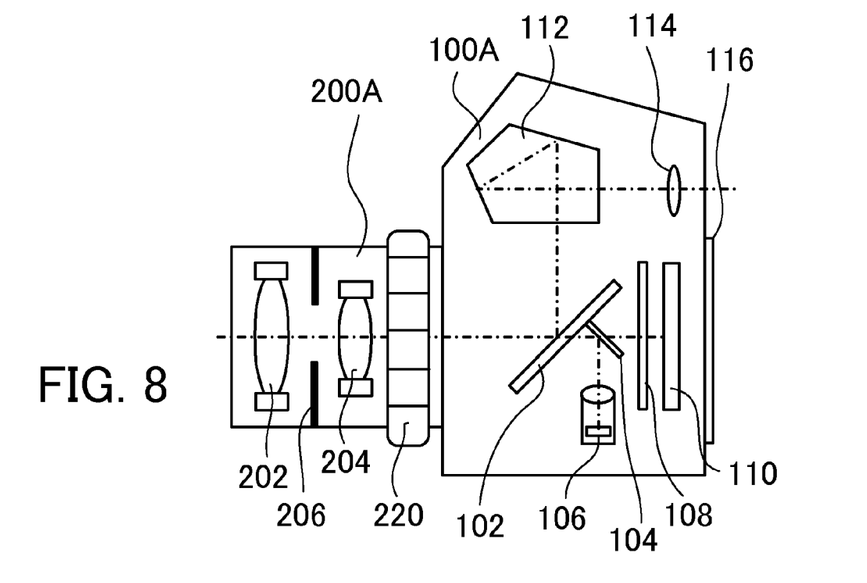
FIG. 8 is a schematic sectional view of a digital camera according to a third embodiment of the present invention.
Figure 9:
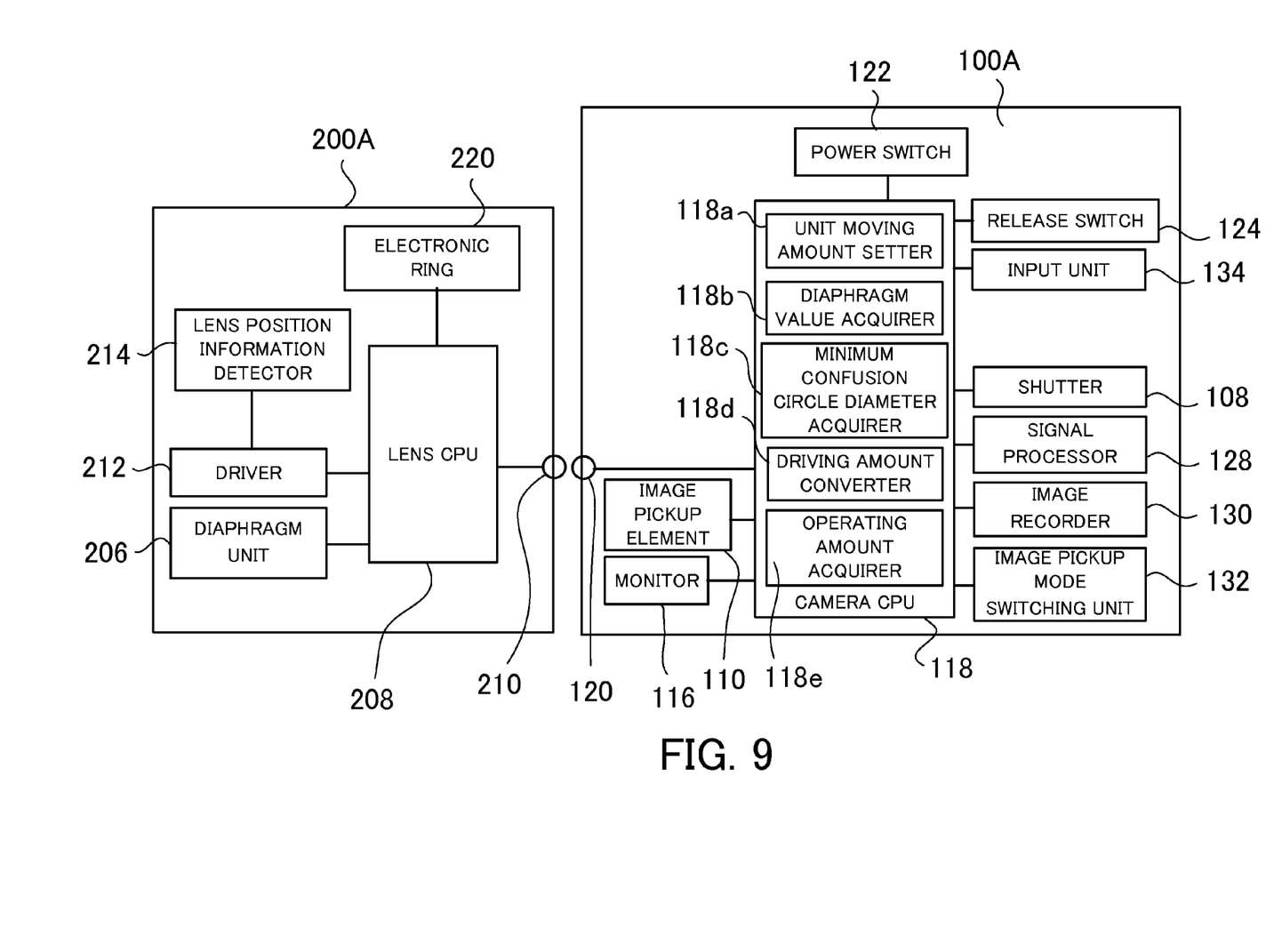
FIG. 9 is a system block diagram of the digital camera illustrated in FIG. 8 according to the third embodiment.

FIG. 8 is a schematic sectional view of a digital camera according to a third embodiment, and FIG. 9 is its system block diagram. Those elements which are corresponding elements in FIGS. 1 and 2 will be designated by the same reference numerals. Reference numeral 100A denotes a camera body, and reference numeral 200A denotes a lens barrel that is attachable to and detachable from the camera body 100A.

This embodiment is different from the first embodiment in that the manual operating unit 126 is provided to the camera body 100 in the digital camera according to the first embodiment whereas it is provided to the lens barrel 200A in the digital camera according to the third embodiment. The operation of the camera CPU 118 is similar to that of FIG. 3, and a description thereof will be omitted.

Figure 10A:
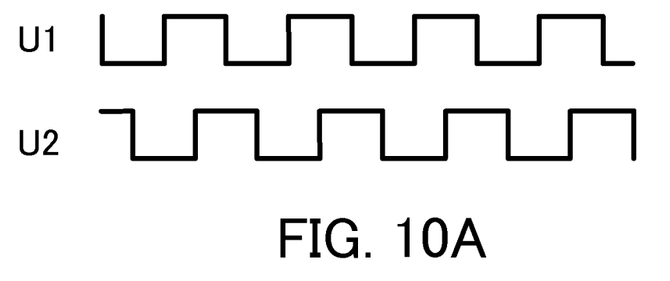
FIGS. 10A and 10B are views for explaining a method for calculating a unit moving amount based upon an output of an electronic ring illustrated in FIG. 8 according to the third embodiment.

The manual operating unit of this embodiment includes an electronic ring 220 rotatably fixed onto (around the outer circumference of) the lens barrel 200A that houses the image pickup optical system. As the electronic ring 220 is rotated, the second lens unit 204 is moved. The electronic ring 220 outputs a pulsed signal illustrated in FIG. 10A as it is rotated, and the second lens unit 204 is driven in accordance with the number of pulses in the pulsed signal. FIG. 10A illustrates that two rectangular waves U1 and U2 are outputted which have phases shifting by 90° as the electronic ring 220 is rotated.

The interval between the counted pulsed signals is very short, and it is thus difficult to assign a predetermined amount per unit operation to a single pulse output as the electronic ring 220 rotates.

Figure 10B:
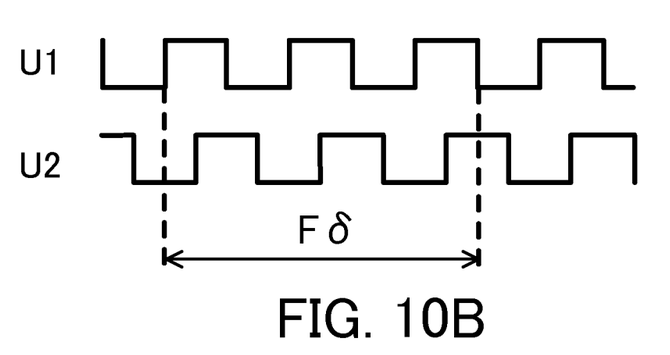

FIG. 10B is a view for explaining a calculating method of a unit moving amount in this case. This embodiment assigns the unit moving amount Fδ to the plurality of continuously output, pulsed signals U1 and U2. While FIG. 10B assigns Fδ to a time period from a leading edge to a third trailing edge of the pulsed signal U1, but the pulsed signal U2 may be utilized or both signals may be used, such as the leading edge of the pulsed signal U1 and the leading edge of the pulsed signal U2.

The counterclockwise rotation of the electronic ring 220 may be set to the infinity side, and its clockwise rotation is set to the closest side. The user can perceive the electronic sounds, vibrations, or the like, and can determine whether he has conducted a unit operation.

This embodiment can perform focusing by a unit moving amount with a unit of the depth of focus per unit operation of the electronic ring 220, and improve the operability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-201293, filed Sep. 15, 2011 which is hereby incorporated by reference herein in its entirety.

What is claimed is:

1. An optical apparatus comprising:
   a diaphragm configured to adjust a light quantity;
   an image pickup optical system including a focus lens unit that moves during focusing and configured to form an optical image of an object;
   a manual operating unit configured to manually operate a movement of the focus lens unit in a manual focus mode; and
   a controller configured to control a movement of the focus lens unit in accordance with an operating amount of the manual operating unit by allowing setting of, as a unit moving amount that is a moving amount of an in-focus position of the image pickup optical system per unit operation of the manual operating unit, a value based on a product between a depth of focus and a coefficient that is a natural number or a reciprocal of the natural number,
   wherein the controller sets the coefficient larger when a distance between an in-focus position of the focus lens unit with respect to the object and a current position of the focus lens unit is larger than a predetermined threshold than when the distance is smaller than the predetermined threshold.

2. The optical apparatus according to claim 1, wherein the manual operating unit includes a touch screen for moving the focus lens unit according to a touch operation by a user.

3. The optical apparatus according to claim 1, further comprising:
    an image pickup element configured to provide a photoelectric conversion for the optical image formed by the image pickup optical system; and
    a display unit configured to display an image based upon an signal output from the image pickup element,
    wherein the controller is configured to select an image pickup mode, which includes a live-view image pickup mode used to sequentially display and capture images based upon the signal output from the image pickup element.

4. The optical apparatus according to claim 3, wherein the display unit magnifies and displays the area to be focused, which has been set.

5. The optical apparatus according to claim 3, wherein the manual operating unit is provided to a predetermined area displayed on the display unit.

6. The optical apparatus according to claim 1, wherein the manual operating unit is a dial and the unit operation is a rotation of the dial.

7. The optical apparatus according to claim 1, wherein the manual operating unit is an electronic ring that is rotatably provided on a lens barrel that houses the image pickup optical system, and the operation of the manual operating unit is a rotation of the electronic ring.

8. The optical apparatus according to claim 1, wherein the optical apparatus includes a camera body and an exchange lens that is attachable to and detachable from the camera body.

* * * * *